(12) United States Patent
Winkelmuller et al.

(10) Patent No.: US 11,619,151 B2
(45) Date of Patent: Apr. 4, 2023

(54) OIL PAN ASSEMBLY

(71) Applicant: Liebherr-Components Colmar SAS, Colmar (FR)

(72) Inventors: Hugues Winkelmuller, Sainte Coix en Plaine (FR); Richard Giaccardi, Colmar (FR)

(73) Assignee: Liebherr-Components Colmar SAS, Colmar (FR)

( * ) Notice: Subject to any disclaimer, the term of this patent is extended or adjusted under 35 U.S.C. 154(b) by 0 days.

(21) Appl. No.: 17/648,643

(22) Filed: Jan. 21, 2022

(65) Prior Publication Data

US 2022/0235681 A1  Jul. 28, 2022

(30) Foreign Application Priority Data

Jan. 22, 2021 (DE) .................... 10 2021 101 304.6

(51) Int. Cl.
*F01M 11/00* (2006.01)

(52) U.S. Cl.
CPC ... *F01M 11/0004* (2013.01); *F01M 2011/005* (2013.01); *F01M 2011/0087* (2013.01)

(58) Field of Classification Search
CPC ......... F01M 11/0004; F01M 2011/005; F01M 2011/0087; F01M 2011/0037
See application file for complete search history.

(56) References Cited

U.S. PATENT DOCUMENTS

| | | | |
|---|---|---|---|
| 3,817,354 A * | 6/1974 | Meiners | F16H 57/0415 165/185 |
| 4,068,646 A * | 1/1978 | Hnojsky | F01M 11/0004 180/69.1 |
| 4,669,432 A | 6/1987 | Harada | |
| 6,003,878 A | 12/1999 | Noble et al. | |
| 10,273,842 B2 | 4/2019 | Clark et al. | |
| 2009/0145395 A1 | 6/2009 | Ishii et al. | |
| 2010/0066033 A1* | 3/2010 | Jessberger | F16J 15/064 184/106 |
| 2016/0169388 A1 | 6/2016 | Halla et al. | |
| 2019/0145518 A1 | 5/2019 | Panchangam Nivarthi et al. | |

FOREIGN PATENT DOCUMENTS

| | | |
|---|---|---|
| DE | 2851179 A1 | 6/1979 |
| DE | 19622678 C1 | 8/1997 |
| DE | 19638817 A1 | 3/1998 |
| EP | 0661420 B1 | 9/1996 |

(Continued)

OTHER PUBLICATIONS

European Patent Office, Extended European Search Report Issued in Application No. 22152180.0, dated Jun. 23, 2022, Germany, 7 pages.

(Continued)

*Primary Examiner* — Jacob M Amick
(74) *Attorney, Agent, or Firm* — McCoy Russell LLP

(57) ABSTRACT

An internal combustion engine having at least twelve cylinders, comprising a crankcase and an oil pan assembly attached to a bottom side of an engine casing, wherein the oil pan assembly is formed by at least one casted segment. The oil pan assembly is formed by at least two segments, wherein the at least two segments are casted parts and are arranged next to each other in a longitudinal direction of the engine.

20 Claims, 9 Drawing Sheets

(56) References Cited

FOREIGN PATENT DOCUMENTS

| | | |
|---|---|---|
| EP | 0831258 A2 | 3/1998 |
| EP | 1688595 B1 | 6/2009 |
| EP | 2981691 B1 | 5/2019 |
| KR | 20050041224 A | 5/2005 |
| WO | 2016099828 A1 | 6/2016 |

OTHER PUBLICATIONS

European Patent Office, Extended European Search Report Issued in Application No. 22152155.2, dated Jun. 23, 2022, Germany, 7 pages.

* cited by examiner

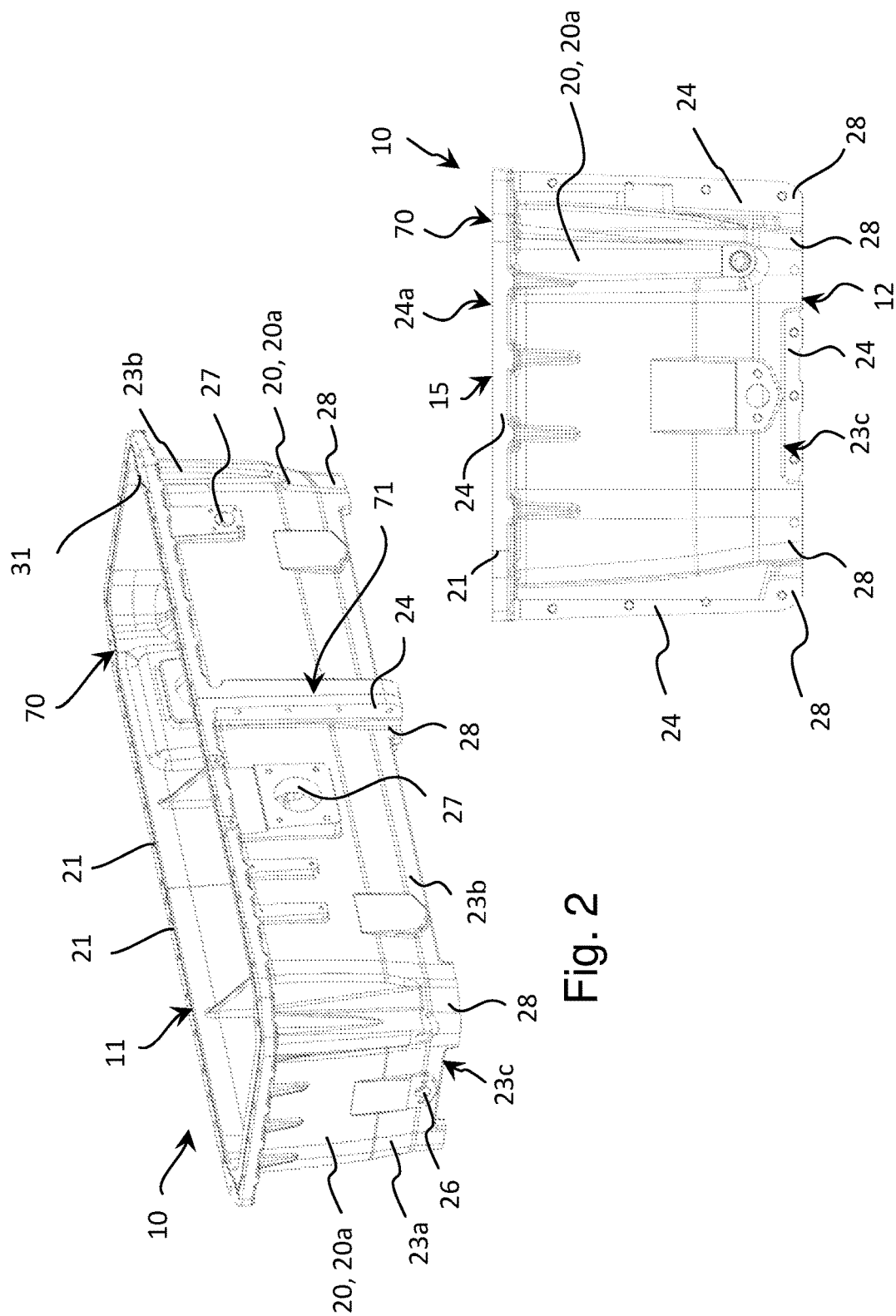

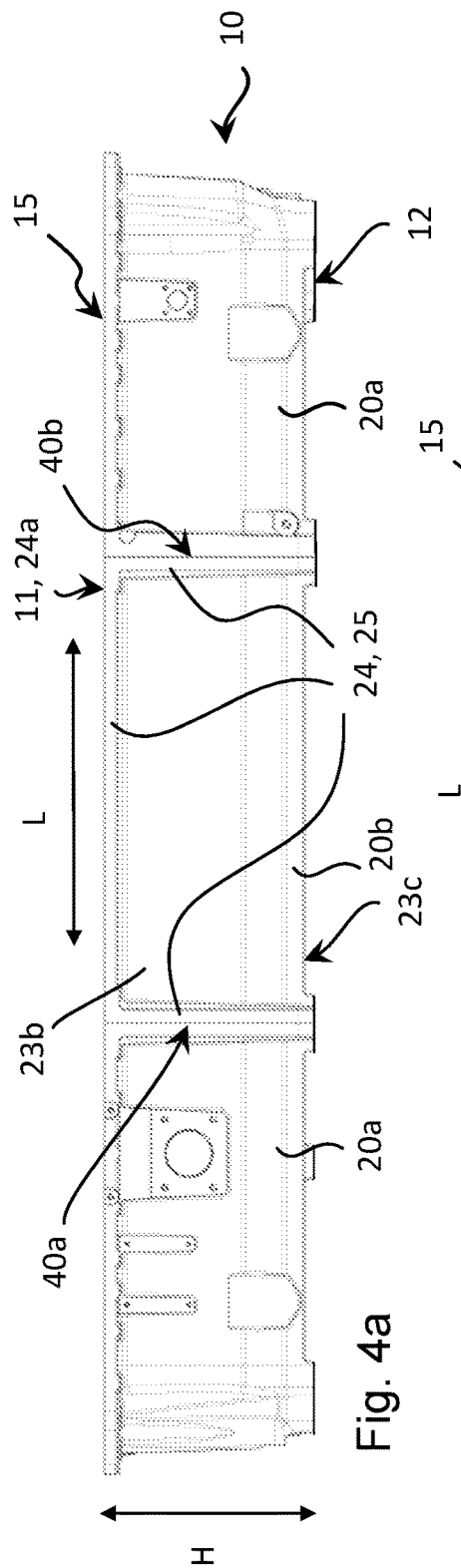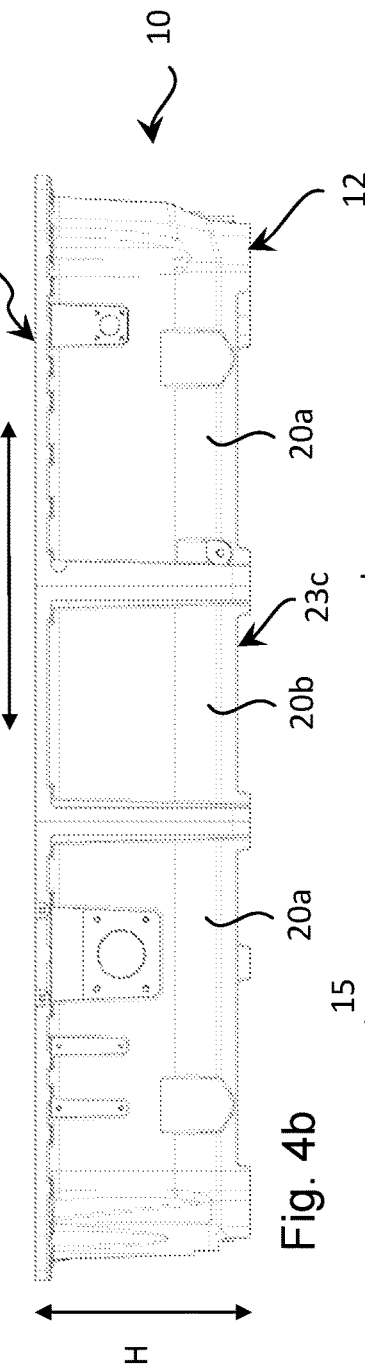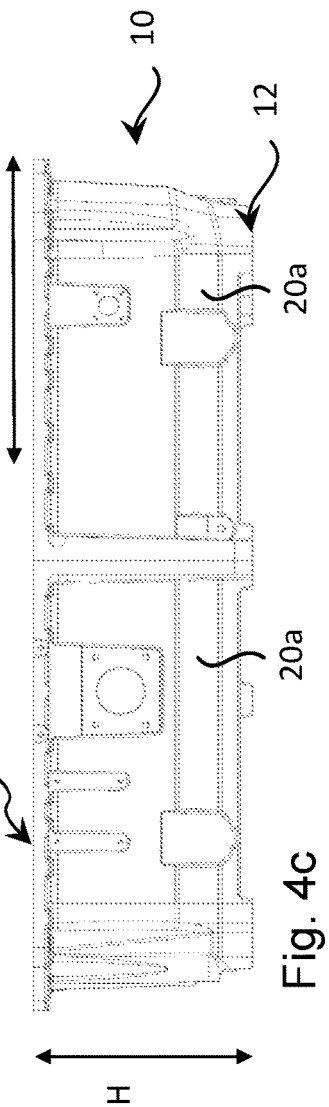

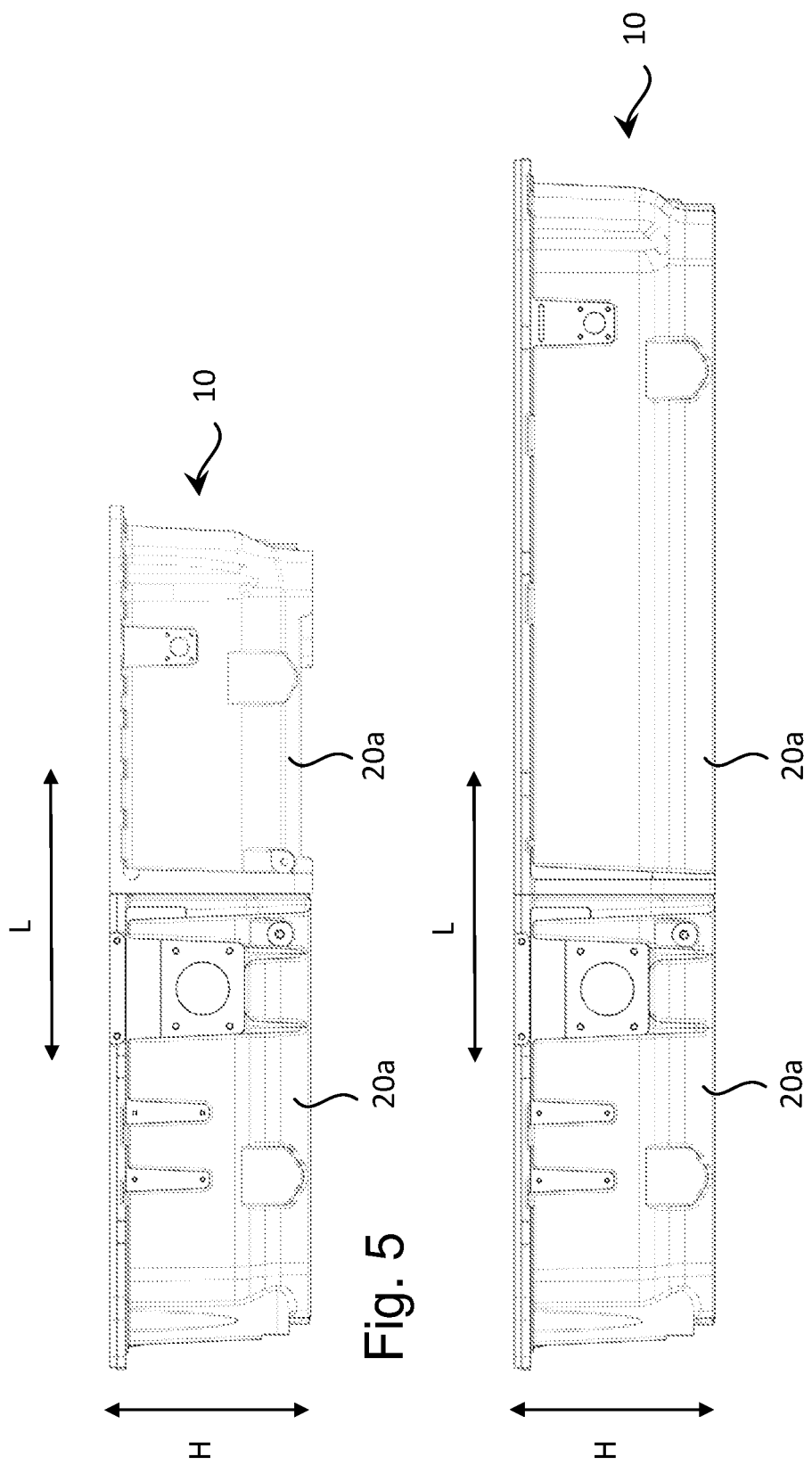

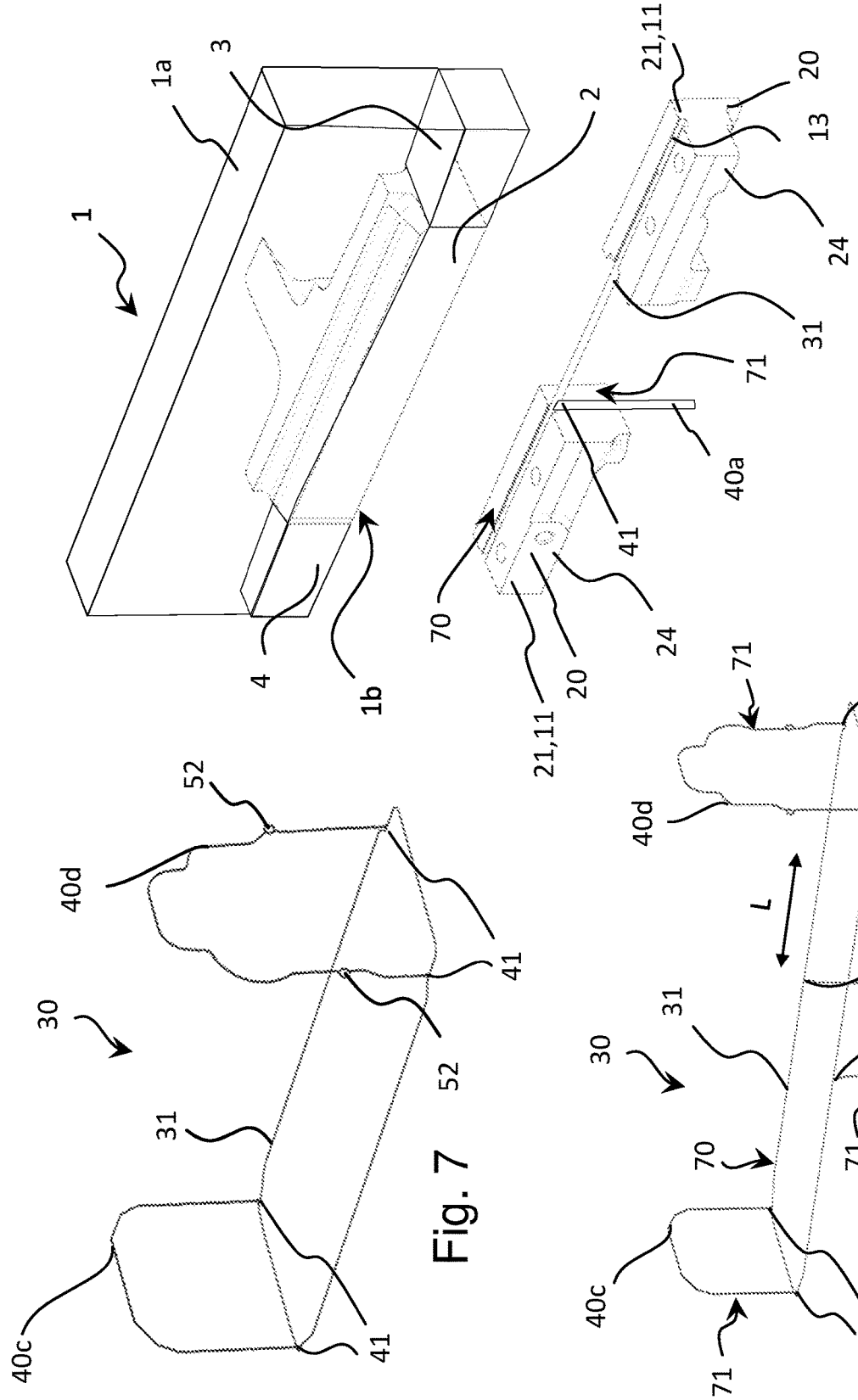

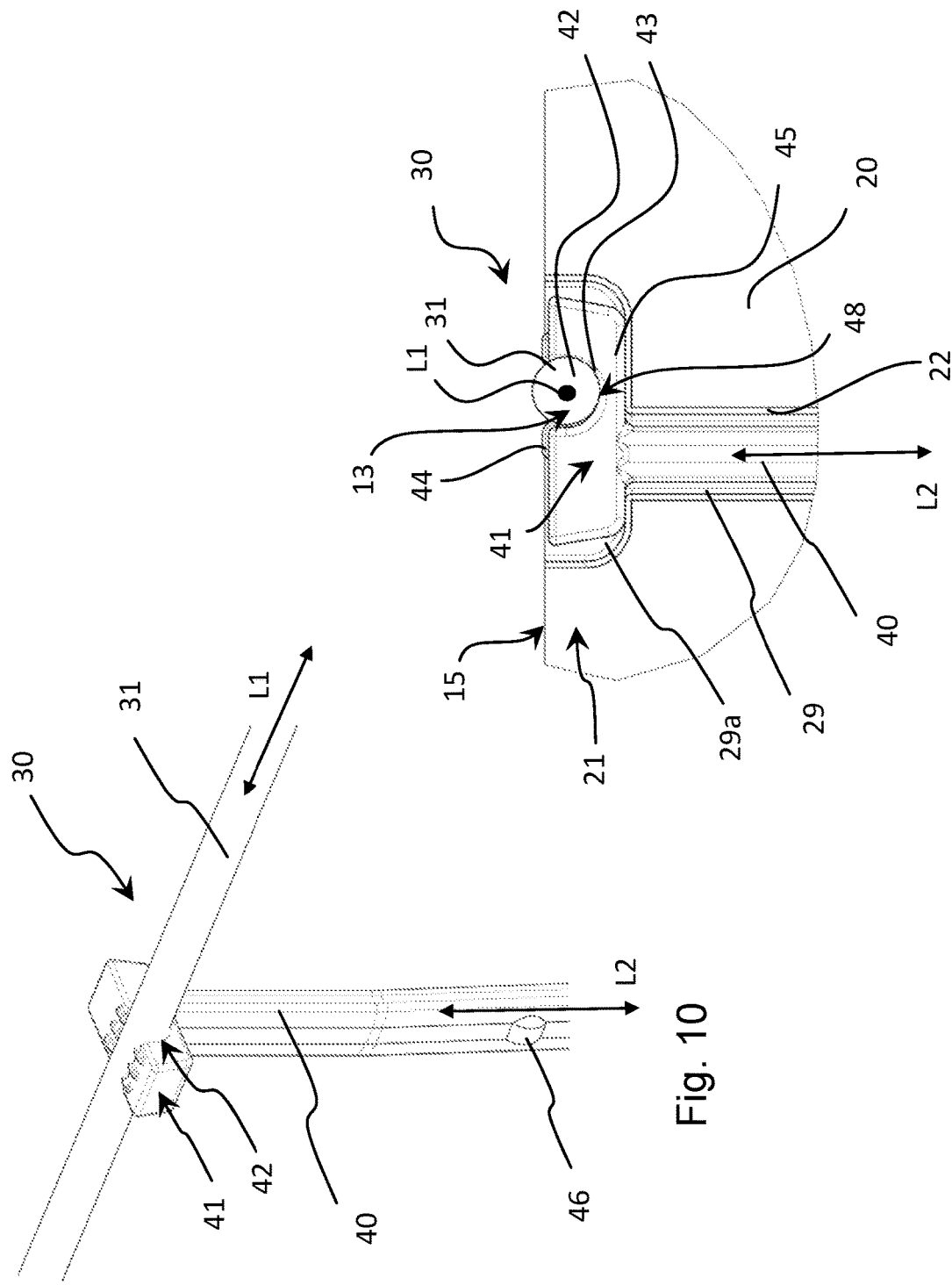

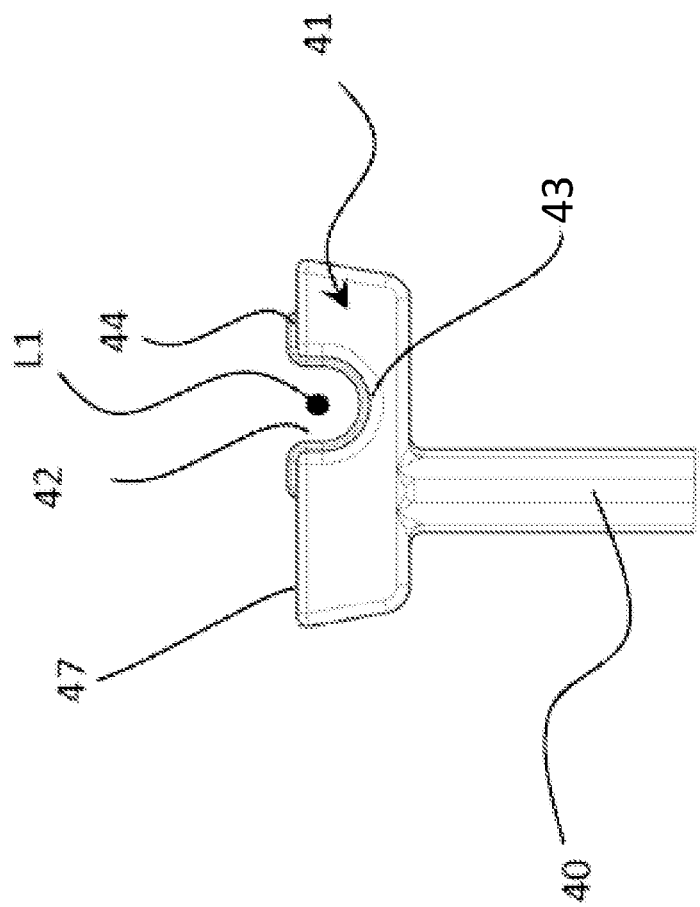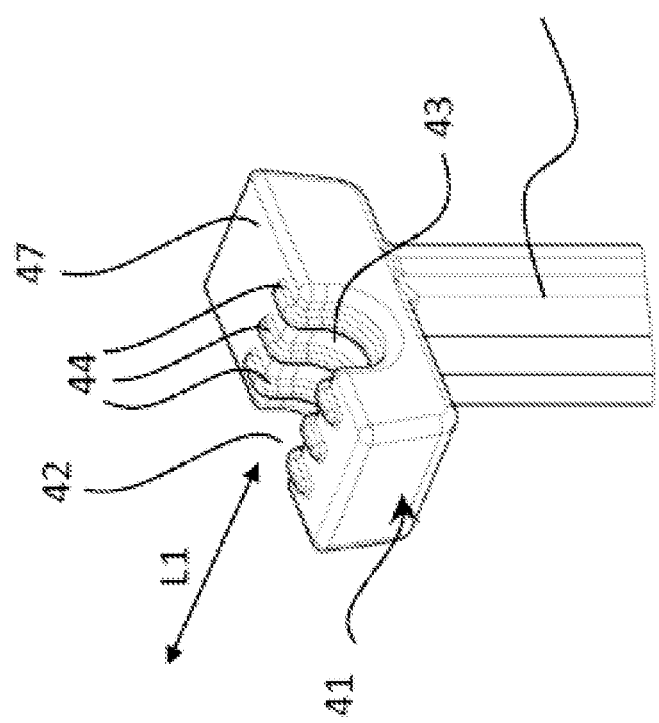

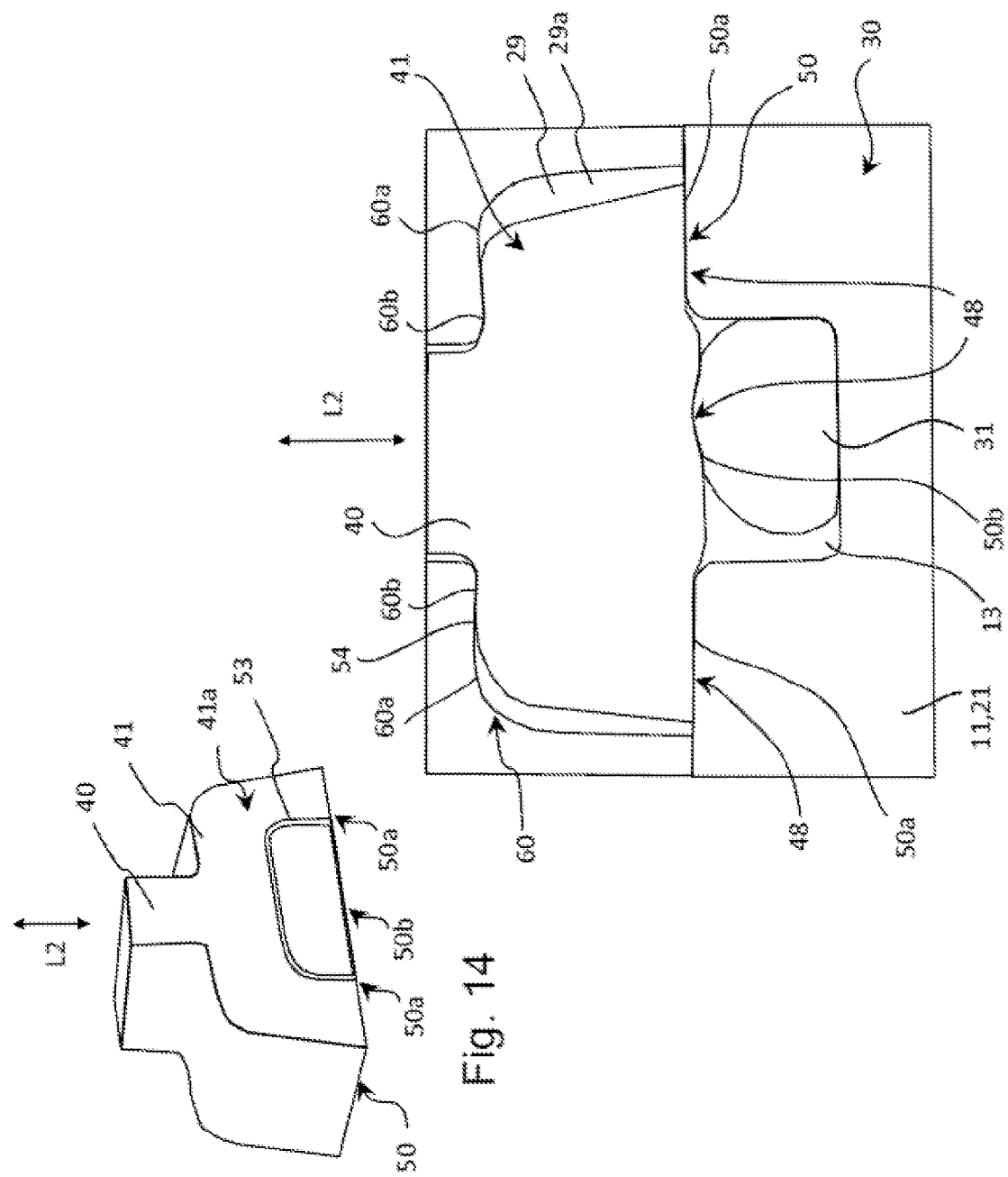

OIL PAN ASSEMBLY

CROSS-REFERENCE TO RELATED APPLICATION

The present application claims priority to German Patent Application No. 10 2021 101 304.6 filed on Jan. 22, 2021. The entire contents of the above-listed application is hereby incorporated by reference for all purposes.

TECHNICAL FIELD

The present disclosure relates to an internal combustion engine comprising an oil pan assembly.

BACKGROUND

Oil pans serve for the storage as well as for the collection of oil and its supply to an internal combustion engine. In the course of the development of internal combustion engines, oil pans have been adapted and optimized to meet the respective requirements according to the engine's field of application and its size.

SUMMARY

U.S. Pat. No. 4,068,646 shows an oil pan comprising two separate sections each of which is secured independently to the engine as well as to each other, wherein one end of the oil pan being downwardly relatively deep while an opposite end thereof is downwardly shallow. During repair, one of the sections can be removed independently from the other section.

EP 0 661 420 B1 shows an overpan for sound proofing an oil pan and an engine, for which purpose the overpan encloses the oil pan at a distance, wherein the overpan is split into two parts by a parting line.

U.S. Pat. No. 10,273,842 B2 shows an oil pan assembly for an agricultural tractor, comprising a first portion including an inner set of openings configured to receive a first set of fasteners to couple the first portion to an engine block and a second portion including an outer set of openings positioned laterally outward relative to the inner set of openings and configured to receive a second set of fasteners to couple the second portion to the first portion and the engine block.

EP 2 981 691 B1 shows an oil sump arrangement for a piston engine, the oil sump arrangement comprising an oil sump, wherein a partition wall is arranged between side walls of the oil sump for dividing the oil sump into compartments.

Oil sumps for smaller engines, as those discussed above, are mostly formed from plastic or metal sheets.

However, especially with regard to engines of large size, a large oil pan having high stiffness is required. Therefore, especially for large engines, the oil pan is formed as a casted part.

EP 1 688 595 B1 shows an oil sump for an internal combustion engine, which oil sump is cast from an iron material and has a flange surface by means of which the oil sump can be screwed, with the interposition of a seal, to the crankcase of the internal combustion engine.

In view of the resulting increased cost and weight of the casted oil pan due to its size, specific design changes of the oil pan are required to simplify the manufacture and/or handling of the oil pan accordingly.

The object of the present disclosure is therefore to provide an improved internal combustion engine comprising an oil pan assembly.

This object is solved by an internal combustion engine or by a set comprising at least two different internal combustion engines.

The present disclosure provides an internal combustion engine comprising an engine casing and an oil pan assembly attached to a bottom side of the engine casing, wherein the oil pan assembly is formed by at least one casted segment. According to the disclosure the oil pan assembly is formed by at least two segments, wherein the at least two segments are casted parts and are arranged next to each other in a longitudinal direction of the engine.

In this way, the weight and size of the individual parts of the oil pan assembly can be reduced, thus facilitating the manufacture and transport of the parts and the assembly of the oil pan assembly. By arranging the segments next to each in longitudinal direction of the engine, the length of the oil pan assembly can be adjusted.

In an embodiment of the present disclosure, the engine has at least twelve cylinders. The above advantages are particularly useful for such big engines.

In an embodiment of the present disclosure, a segment interface between two adjacent segments is transverse to a first interface between an upper edge portion of the oil pan assembly and the bottom side of the engine casing.

Thus the assembly of the oil pan assembly can be simplified.

In an embodiment, the first interface extends in a single plane.

In an embodiment, the segment interface extends in a single plane.

In an embodiment each segment interface is orthogonal to the first interface and/or arranged vertically.

In an embodiment of the present disclosure, the oil pan assembly comprises two end segments each having an end wall and two side walls.

In an embodiment of the present disclosure, the end segments are directly connected to each other.

In an alternative embodiment of the present disclosure, the oil pan assembly further comprises at least one middle segment arranged between the end segments, wherein the middle segment comprises two side walls.

In an embodiment of the present disclosure, each segment also comprises a bottom wall connecting the side walls and/or the end wall.

In an embodiment of the present disclosure, the remaining sides of a segment are open. In particular, an end segment may have an open front on a side opposite the end wall. A middle segment may have open fronts on its two opposing axial sides.

In an embodiment of the present disclosure, the upper side of each segment is open.

In an embodiment of the present disclosure, at least one of the segments comprises a flange, which is attachable to another segment and/or to the bottom side of the engine casing by means of fasteners, wherein the fasteners may lead through interspaced openings provided in the flange.

In an embodiment of the present disclosure, the flange of at least one segment and each flange of the segments may comprise an interface surface with another segment or engine part formed by material removal from the casted part, in particular by milling.

In an embodiment of the present disclosure, at least one out of two flanges forming an interface is provided with a groove for receiving a sealing element. The sealing element may be an O-ring or a molded seal element. The groove may be provided by material removal, in particular by milling.

In an embodiment of the present disclosure, the flange of at least one segment is formed so as to entirely surround an edge of the segment. For instance, the flange of an end segment comprises an upper flange surface forming a part of the upper edge portion of the oil pan assembly and pressing a part of an O-ring against the bottom side of the engine casing, and further comprises a flange end surface pressing a molded seal against an end surface of an adjacent segment.

In an embodiment of the present disclosure, the upper flange surface and the flange end surface are arranged orthogonally to each other.

In an embodiment of the present disclosure, a middle segment comprises a flange with two upper flange surfaces each forming a part of the upper edge portion of the oil pan assembly and each pressing a part of an O-ring against the bottom side of the engine casing, and with two opposite flange end surfaces respectively pressing a molded seal against an end surface of a respective adjacent segment.

In some embodiments, the two upper flange surfaces are arranged orthogonally to the two opposite flange end surfaces and/or wherein the flange of the middle segment is formed so as to entirely surround an edge of the middle segment.

In an embodiment of the present disclosure, the engine casing is a crankcase, such that the upper edge portion of the oil pan assembly is attached to a bottom side of the crankcase. In an embodiment of the present disclosure, a crankshaft extends within the crankcase.

In an embodiment of the present disclosure, a rotational axis of the crankshaft extends at a level above the upper edge portion of the oil pan assembly forming the first interface to the engine housing.

In an embodiment of the present disclosure, the crankshaft is supported at at least two opposite end portions in the crankcase.

In an embodiment of the present disclosure, the crankshaft extends through at least one opening provided in a sidewall of the crankcase. A bottom side of the sidewall of the crankcase extending below the opening may be attached to an upper edge portion of the oil pan assembly.

In an embodiment of the present disclosure, the oil pan assembly and in particular the at least two segments of the oil pan assembly is/are attached to a bottom side of the crankcase.

In an embodiment of the present disclosure, at least one segment comprises a plurality of leg portions. The legs may extend from a wall of the segment in a direction away from a segment upper edge portion.

For instance, the legs are integrally casted with the segment and/or at least one of the legs forms at least a part of a flange for fastening two adjacent segments together.

The legs may extend from a bottom wall and/or a side wall and/or an end wall of the segment in a direction away from a segment upper edge portion.

In an embodiment of the present disclosure, the segments each comprise a plurality of leg portions supporting the oil pan assembly when it is placed on a ground surface. In particular, the bottom surface of all the leg portions may be arranged to extend in a single plane.

By providing an oil pan assembly with leg portions, the segments of the oil pan assembly can be individually placed onto the ground and the mounting process of the oil pan assembly may be facilitated.

In an embodiment of the present disclosure, the at least two segments each have an equal segment height.

In an embodiment of the present disclosure, the at least two segments are configured such that the segments, when being placed on a flat surface and arranged adjacent to each other, the two segments are connectable to each other. For instance, the segments together form a flat upper surface of the oil pan assembly and/or a surface in which a first groove in which the O-ring can be arranged is provided.

With the same segment height, the mounting of the segments among each other can be facilitated. In particular, both segments can be placed on a flat surface next to each other for being connected to each other. It can also be ensured that the segments form a flat surface, which is necessary to achieve a secure seal at the first interface.

In an embodiment of the present disclosure, at least one of the segments comprises at least one stiffening rib connecting one side wall with another side wall and/or with a bottom wall, wherein at least one stiffening rib can be formed such that an oil exchange is possible from an area located adjacent to one side of the stiffening rib to an area located adjacent to another side of the stiffening rib and/or wherein one or more openings are provided between the stiffening rib and the segment from which the stiffening rib extends.

Especially regarding large internal combustion engines having at least twelve cylinders and a corresponding large oil pan assembly, stiffening ribs enhance the stability of the segments.

In an embodiment of the present disclosure, the at least one stiffening rib is configured such that in a side view along a longitudinal direction of the engine, the stiffening rib comprises two side portions and a middle portion arranged there between, wherein at least one of the side portions reaches closer to an imaginary plane defined by a segment upper edge portion than the middle portion.

In an embodiment of the present disclosure, the oil pan assembly comprises at least one opening, such as provided in a segment side wall and/or end wall, for allowing an oil exchange between an inside and an outside area of the oil pan assembly. For instance, the oil pan assembly comprises at least two openings and/or wherein one of the openings is arranged closer to a bottom wall of the oil pan assembly than another of the openings.

In an embodiment of the present disclosure, at least one of the openings may serve as an oil outlet. In particular, an inlet side of an oil pump may be connected to the oil pan via the opening.

The present disclosure further comprises a set comprising at least two different internal combustion engines, the at least two engines may comprise a different number of cylinders. The at least two internal combustion engines each comprise at least one first segment of the oil pan assembly that is identical for the at least two internal combustion engines, wherein a second internal combustion engine comprises at least one second segment of the oil pan assembly which is different from a second segment of the oil pan assembly of a first internal combustion engine or provided in addition to the segments of the oil pan assembly of a first internal combustion engine, wherein the second segment of the oil pan assembly may be attached to the at least one first segment of the oil pan assembly.

Thus manufacturing costs can be reduced due to identical segments.

In an embodiment of the present disclosure, the first internal combustion engine comprises two end segments, which are directly attached to each other so as to form a first oil pan assembly, and the second internal combustion engine comprises two end segments of the oil pan assembly which are respectively identical to the two end segments of the first internal combustion engine, and at least one middle segment of the oil pan assembly, wherein the two end segments and the least one middle segment of the second internal combustion engine are respectively attached to each other so as to form a second oil pan assembly.

In a further embodiment of the present disclosure, the second internal combustion engine comprises two end segments of the oil pan assembly, which are directly attached to each other so as to form a second oil pan assembly, wherein one of the end segments is identical for the first and the second internal combustion engines and one of the end segments is different for the at least two internal combustion engines.

In a further embodiment of the present disclosure, the first and the second internal combustion engine each comprise two end segments of the oil pan assembly which are respectively identical, and different middle segments, the two end segments and the least one middle segment being respectively attached to each other so as to form an oil pan assembly.

In an embodiment of the present disclosure, the oil pan assembly comprises an O-ring for sealing a first interface between an upper edge portion of the oil pan assembly and the bottom side of the engine casing. The O-ring extends in a plane formed by the first interface, wherein the oil pan assembly may further comprise at least one molded seal for sealing a segment interface between two adjacent segments. Each molded seal comprises two seal end portions, which are respectively sealingly connected to the O-ring, wherein at least one molded seal can be arranged in a groove provided in one of the segment end surfaces.

Thus a simple sealing arrangement is provided for sealing a first interface and at least a second interface, which is a segment interface and which is present between two adjacent segments of the oil pan assembly.

In an embodiment of the present disclosure, the O-ring has the same cross-section over its entire extension.

In an embodiment of the present disclosure, the sealing areas are provided on a front end side of the seal end portions and contact a side surface of the O-ring. In particular, the side surface of the O-ring contacted by the sealing area may be formed by one side of constant cross-section of the O-ring.

In an embodiment of the present disclosure, a groove is provided in the sealing surface of at least one seal end portion for retaining the O-ring. In particular, the groove may form a sealing area for sealing with the O-ring.

In an embodiment of the present disclosure, the groove is provided in a front end side of the seal end portion.

In an embodiment of the present disclosure, the O-ring extends in a first groove provided in an upper edge portion of the oil pan assembly.

In an embodiment of the present disclosure, the sealing end portions of the molded seal comprise a second groove for receiving the O-ring.

For instance, the first and the second grooves form a groove arrangement in which the O-ring extends.

In an embodiment of the present disclosure, the engine comprises a third and/or a fourth molded seal. The third and/or the fourth molded seal each have two seal end portions respectively being connected to the O-ring so as to seal respective transition regions.

The third molded seal may be provided between a side surface of a crankcase of the engine casing and a side surface of a flywheel housing of the engine casing.

The fourth molded seal may be provided between another side surface of the crankcase and a side surface of a front end of the engine casing.

A sealing surface of the third and/or fourth molded seal may have a flat or convex form.

The sealing end portions may be provided at enlarged shoulder portions provided at the ends of the molded seals, the shoulder portions being retained in enlarged retaining portions of the groove in which the molded seal extends.

For instance, the third and/or the fourth molded seal may comprise at least one opening, such as with an O-shaped form, wherein an oil channel may lead through the opening.

In an embodiment of the present disclosure, the O-ring is manufactured with the same cross-section over its entire extension. The cross-section may in particular be circular in the uncompressed state of the O-Ring. The O-ring may be formed by connecting the ends of a sealing cord.

In an embodiment of the present disclosure, the seal end portions of the third and/or fourth molded seal have a flat or convex shape.

In an embodiment of the present disclosure the engine comprises at least twelve cylinders, or at least 16 cylinders.

In an embodiment of the present disclosure the set comprises at least two different internal combustion engines, each of the engines having at least twelve cylinders.

In an embodiment of the present disclosure the oil pan assembly has a length which is at least 1000 mm.

In an embodiment of the present disclosure at least one of the segments comprises a length of at least 500 mm, or at least 1000 mm, and/or each segment comprises a length of at least 1000 mm.

The present disclosure further comprises a method for manufacturing at least one internal combustion engine comprising an oil pan assembly formed by at least two segments, in particular an internal combustion engine according to any of the herein disclosed embodiments and/or a set comprising at least two different internal combustion engines according to any of the herein disclosed embodiments.

The method comprises providing a first segment, such as a first end segment, being independent from a length of the engine, wherein the first segment may be identical for at least two different internal combustion engine.

In a first variant, the method comprises providing a second segment, such as a second end segment, being selected according to the length of the engine and may also be attachable to the first segment, wherein second segments of at least two different internal combustion engines may be different.

In a second variant of the present disclosure, the method comprises providing a second end segment and at least one middle segment for being arranged between the first end segment and the second end segment, wherein at least one out of the second end segment and the middle segment is selected according to the length of the engine.

In an embodiment of the present disclosure, the other one out of the second end segment and the middle segment is identical for at least two different internal combustion engines.

For instance, the middle segment is selected according to the length of the engine, and the second end segment is identical for at least two different internal combustion engines.

In particular, selecting the middle segment according to the length of the engine may comprise not using a middle segment for one of the at least two different internal combustion engines and using a middle segment for the other one.

Further, selecting the middle segment according to the length of the engine may comprise using middle segments of different lengths for at least two different internal combustion engines.

BRIEF DESCRIPTION OF THE FIGURES

The present disclosure will now be described with reference to embodiments and drawings.

The figures show:

FIG. 2 an isometric view of the embodiment shown in FIG. 1 in a state in which the two segments are attached to each other;

FIG. 3 a side view from the left of the embodiment shown in FIG. 2;

FIG. 4a a front view of an embodiment comprising an oil pan assembly having two end segments and one middle segment;

FIG. 4b a front view of an embodiment comprising an oil pan assembly having two end segments and a middle segment being different to the middle segment of the embodiment shown in FIG. 4a;

FIG. 4c a front view of an embodiment comprising an oil pan assembly having two end segments being directly connected to each other;

FIG. 5 a front view of an embodiment comprising an oil pan assembly having two end segments;

FIG. 6 a front view of an embodiment comprising an oil pan assembly having two end segments, wherein the end segment on the left in FIG. 6 is identical to the end segment shown on the left in FIG. 5;

FIG. 7 an isometric view of an embodiment comprising a sealing arrangement having an O-ring and two molded seals;

FIG. 8 an isometric view of an embodiment comprising a sealing arrangement having an O-ring and three molded seals;

FIG. 9 an isometric, partly explosive view of an embodiment showing schematically an internal combustion engine comprising an oil pan assembly with two segments and comprising a sealing arrangement with an O-Ring and a molded seal;

FIG. 10 an isometric view of an embodiment comprising a sealing arrangement with an O-ring and a molded seal, the O-ring being arranged in a groove provided in the molded seal, wherein the sealing arrangement is shown separate from a casing;

FIG. 11 a side view from the left of the embodiment of the sealing arrangement shown in FIG. 10, wherein the sealing arrangement is arranged in a groove;

FIG. 12 an isometric view of an embodiment comprising a molded seal with a seal end portion having sealing ribs;

FIG. 13 a side view from the left of the embodiment shown in FIG. 12;

FIG. 14 an isometric view of an embodiment comprising a molded seal having a sealing protrusion;

FIG. 15 a cross-sectional view of an embodiment comprising a molded seal for being arranged at a side of the O-ring facing away from a first groove in which the O-ring is arranged.

DETAILED DESCRIPTION

Figure 1:
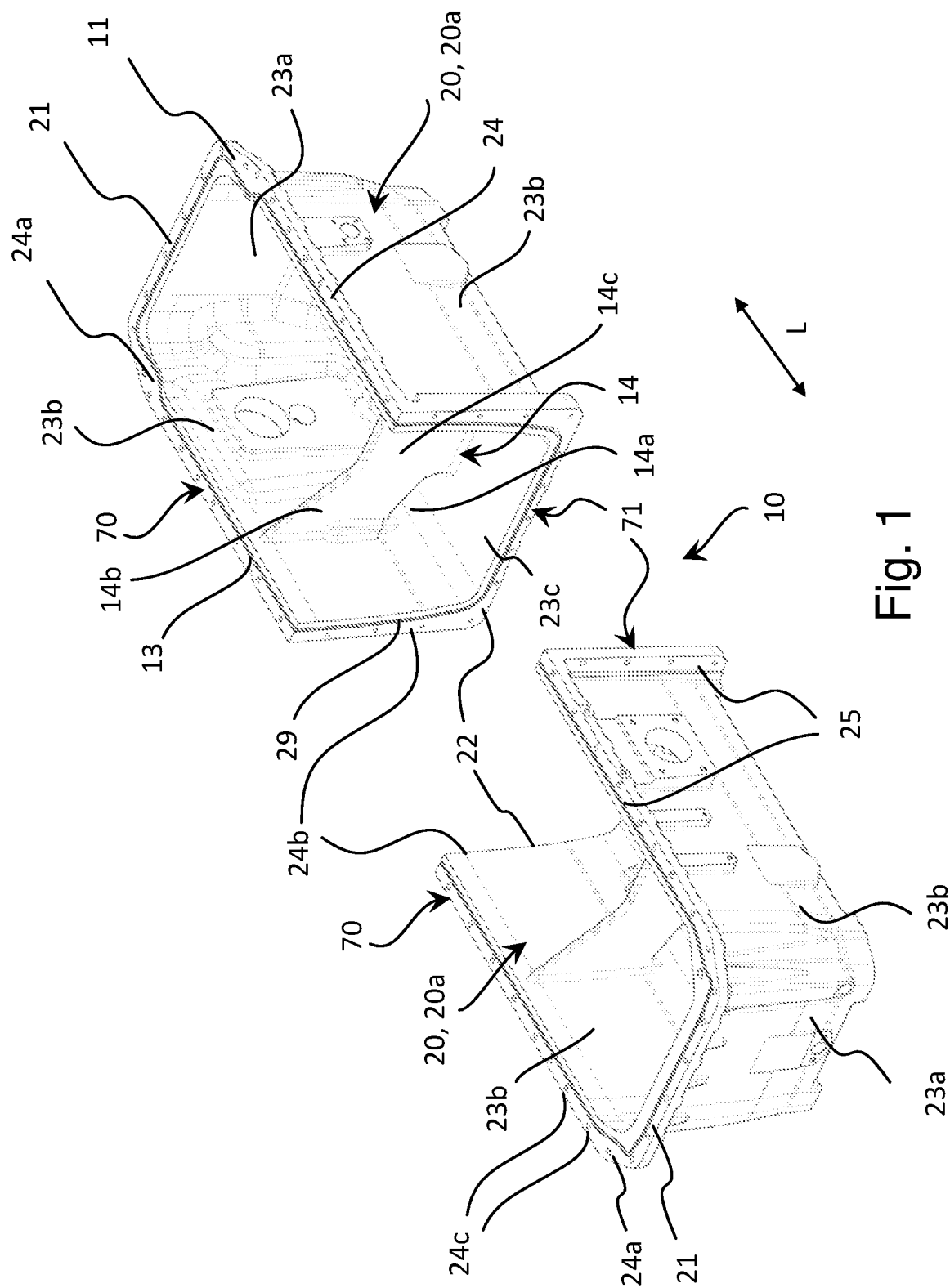
FIG. 1 an isometric view of an embodiment comprising an oil pan assembly having two segments and a sealing arrangement, the embodiment being shown in a demounted state.

FIG. 1 shows an embodiment of the present disclosure with an oil pan assembly 10 and a sealing arrangement 30, wherein several aspects of the present disclosure are realized in combination. However, the features of these aspects described in the embodiment may also be realized separately.

According to a first aspect of the present disclosure an internal combustion engine 1 is provided having an oil pan assembly 10 which comprises at least two segments 20, wherein the segments 20 are casted parts.

As can be seen in FIG. 1 the oil pan assembly 10 comprises two segments 20 being two end segments 20a, which respectively comprise an end wall 23a, two side walls 23b, and a bottom wall 23c, the walls forming a part of the oil pan assembly 10. As can be seen in FIG. 4a and FIG. 4b the oil pan assembly 10 may comprise a middle segment 20b, which comprises a bottom wall 23c and two side walls 23b (only one of the two side walls 23b is respectively shown in FIG. 4a and FIG. 4b).

The embodiment shown in FIG. 1 comprises an oil pan assembly 10 with two segments 20, wherein the embodiment is shown in a demounted state. In an embodiment, the two segments 20 can be attached to each other at a second interface 71 and to a bottom side of an engine casing at a first interface 70 (not shown) by fasteners (not shown) leading through interspaced openings 24c provided in flanges 24. In a mounted state the segments 20 are attached to each other and to the underside of the engine thus compressing a sealing arrangement for sealing the respective interfaces between the parts.

In the embodiment shown in FIG. 1, the upper edge portion 11 of the oil pan assembly 10 is provided with a first groove 13 for receiving a sealing element for sealing the first interface 70 with the bottom side of an engine casing (not shown). One of the end faces 22 of the segments 20 is equally provided with a groove 29 receiving a sealing element for sealing the second interface 71 between the two segment end surfaces 22 of the segments 20.

The two segments 20 of the embodiment shown in FIG. 1 are casted parts, wherein the segments 20 are arranged next to each other in a longitudinal direction L of the engine (not shown). The longitudinal direction L of the engine corresponds to the axial extension of a crankshaft 2a (for example shown in FIG. 16) of the engine.

In the embodiment shown in FIG. 1 the segments 20 each comprise a segment end surface 22 being such configured that when the segments 20 are attached to each other the segment end surfaces 22 form the second interface 71 between the segments 20. The second interface 71 shown in the embodiment extends in a plane which is orthogonal to the longitudinal direction L, wherein the first interface 70 between the upper edge portion 11 of the oil pan assembly 10 and the bottom side of the engine (not shown) is orthogonal to the second interface 71.

As shown in FIG. 1 each segment 20 may comprise a flange 24 that entirely surrounds the edge 25 of the respective segment 20. Further also a middle segment 20b, as shown in FIG. 4a, may comprise a flange 24 that entirely surrounds the middle segment 20b.

In the embodiment shown in FIG. 1 each of the segments 20 comprises a stiffening rib 14, wherein the configuration of the stiffening ribs 14 is exemplarily described regarding the stiffening rib 14 of the segment 20 shown on the right in FIG. 1. The stiffening rib 14 extends from a side wall 23b to a bottom wall 23c of the segment 20. Further the stiffening rib 14 extends from the bottom wall 23c to the other side wall 23b.

As can be seen in the embodiment shown in FIG. 1 the stiffening rib 14 comprises at least one opening 14a, which allows an oil exchange between an area at one side to an area at another side of the stiffening rib 14. For providing the opening, the stiffening rib 14 does not contact the bottom wall 23c over the entire width of the segment, such that an opening 14a is left between the bottom wall 23c and a lower edge of the stiffening rib 14 in this area. In the embodiment, openings 14a are provided on both sides of a middle portion 14c of the stiffening rib 14 connected to the bottom wall.

In the shown embodiment the stiffening rib 14 comprises a side portion 14b which is arranged closer to the side wall 23b than the middle portion 14c, wherein an upper edge of the side portion 14b reaches closer to the first interface 70 than an upper edge of the middle portion 14c. The same applies to the other side portion (not shown) of the sealing rib 14.

FIG. 2 shows the embodiment of FIG. 1 in a state, in which the segments 20 are attached to each other, wherein the oil pan assembly 10 forms an upper edge portion 11, which is formed by the segment upper edge portions 21.

The embodiment shown in FIG. 2 comprises several openings 26, 27, wherein the opening 26 provided in the oil pan assembly 10 is arranged closer to the bottom wall 23c than the other openings 27. The openings 26, 27 allow an oil exchange between an inside and an outside area of the oil pan assembly. As can be seen, the openings 26, 27 may have different diameters, in order to satisfy different application purposes.

An oil pump may be connected to the mounting area surrounding opening 27, with a suction side oil channel of the pump reaching through opening 27 into the oil pan assembly.

FIG. 3 shows a side view from the left of the embodiment shown in FIG. 2, wherein the end segment 20a comprises a flange 24 that entirely surrounds the end segment 20a and that extends in two planes that are orthogonal to each other. One of the planes forms the second interface 71, as can be seen in FIG. 2. The other plane forms the first interface 70, as can be seen in FIG. 2 and FIG. 3. The flange 24 shown in FIG. 3 comprises an upper flange surface 24a which forms a flat upper surface 15 of the oil pan assembly 10.

In the embodiment shown in FIG. 2 and FIG. 3, each end segment 20a comprises a plurality of leg portions 28, which may be integrally casted with the respective end segment 20a. As can be seen in FIG. 2 and FIG. 3 a portion of the flange 24 may form a leg portion 28.

As can be seen in FIG. 3, the end segment 20a may be such configured that when it is being placed on a flat surface, the leg portions 28 contact the flat surface to support the segment, wherein at least a part of the bottom wall 23c of the end segment 20a is spaced apart from the flat surface. In an embodiment also a middle segment 20b, as for example shown in FIGS. 4a and 4b, may comprise the above described configuration regarding the leg portions 28.

In the embodiment, all the segments have the same height H. In particular, the distance between the bottom side of the leg portions 28 and the upper edge portion 21 of each segment 20 may be identical.

As can be seen in FIG. 2 and FIG. 3, the segments 20 may comprise stiffening ribs provided between the flange 24 and a wall, such as an outer side of a wall, of the respective segment 20.

The surfaces of the segments forming the interfaces, and in particular the segment upper edge portions 21, the segment end surfaces 22 and the grooves 13 and 29 may be formed by material removal from the casted part. In particular, the surface may be formed by milling.

According to a second aspect of the present disclosure a set comprising at least two different internal combustion engines each comprising an oil pan assembly is provided. With the following described modular concept a set of engines with oil pan assemblies is proposed, wherein each oil pan assembly is adapted to a particular size of engine, wherein the oil pan assemblies have at least one segment in common. The oil pan assemblies may in particular be adapted to different lengths of the engine which are due to a difference in the number of cylinders of the engine, wherein the different engines may have between 12 and 20 cylinders, inclusive.

The embodiment of a set shown in FIGS. 4a, 4b, and 4c comprises three different engines (not shown) each having an oil pan assembly 10. Each of the shown oil pan assemblies 10 comprises two end segments 20a, wherein the end segments 20a of the oil pan assembly 10 shown in FIG. 4a are identical to the end segments 20a of the oil pan assemblies 10 shown in FIGS. 4b and 4c. The end segments 20a shown in FIG. 4c are attached to each other directly. Regarding FIG. 4b a middle segment 20b is arranged between the two end segments 20b, wherein the segments 20a, 20b are connected to each other respectively. A further modification is possible, as can be seen FIG. 4a, in which a middle segment 20b of a different length than that shown in FIG. 4b is arranged between the two end segments 20a. Thus a set of three different oil pan assemblies with three different lengths can be provided with only four different segments (end segment 20a shown on the left in FIG. 4a, end segment 20a shown on the right in FIG. 4a, middle segment 20b shown in FIG. 4a, and middle segment 20b shown in FIG. 4b).

In another embodiment, as for example shown in FIGS. 5 and 6, it is also conceivable to provide a set comprising at least two different internal combustion engines (not shown), wherein the engines respectively comprise a first identical end segment 20a, in FIGS. 5 and 6 the respective end segment 20a on the left, wherein the engines further comprise respectively a second end segment 20a, in FIGS. 5 and 6 the respective end segment 20a on the right, being (directly) connected to the first end segment 20a, wherein the second end segments 20a of the engines are different, such as having different lengths, as can be seen in FIGS. 5 and 6.

In the embodiment shown in FIG. 4a, the edge 25 of the middle segment 20b is formed by a flange 24, wherein the flange 24 entirely surrounds the edge 25 of the middle segment 20b.

The height H of a segment 20a, 20b is defined as its extension from its bottom side 12 to its upper surface 15, as shown in FIG. 4a. The segments 20a, 20b of the embodiment shown in FIG. 4a each comprise the same height H. The same applies to the segments of the embodiments shown in FIGS. 4b and 4c, FIG. 5 and FIG. 6. As can be seen from FIGS. 4a to 4c the embodiments each comprise segments 20a, 20b having an equal height H.

The length of the oil pan assembly 10 is defined as its extension in a direction parallel to the longitudinal direction L of the engine, as can be seen in FIGS. 4a to 4c and in FIGS. 5 and 6. In other words the length of an oil pan assembly 10 is defined as its extension from an outer end of an end segment 20*a* (in FIGS. 4*a* to 4*c* on the left) to an outer end of the other end segment 20*a* (in FIGS. 4*a* to 4*c* respectively on the right).

The embodiment of the set shown in FIGS. 4*a* to 4*c* comprises three different oil pan assemblies 10 having different lengths, thus the respective oil pan assembly 10 being designed for a particular engine size. The embodiment of the set shown in FIGS. 5 to 6 comprises two different oil pan assemblies 10 having different lengths, thus the respective oil pan assembly 10 being designed for a particular engine size.

For example the oil pan assembly 10 shown in FIG. 4*a*, 4*b*, 4*c* may be designed for an engine having 20, 16, 12 cylinders, respectively, wherein the respective engine may be a V-type engine.

In the embodiment shown in FIG. 4*a* the oil pan assembly 10 comprises a length greater than 2000 mm and/or is designed for an engine having 20 cylinders.

In the embodiment shown in FIG. 4*b* the oil pan assembly 10 comprises a length greater than 1500 mm and/or is designed for an engine having 16 cylinders.

In the embodiment shown in FIG. 4*c* the oil pan assembly 10 comprises a length greater than 1000 mm and/or is designed for an engine having 12 cylinders.

In an embodiment the internal combustion engine 1 comprising the sealing arrangement 30 and/or the oil pan assembly 10 may be a V-type engine and/or comprises more than 12 cylinders.

Regarding the embodiment shown in FIGS. 4*a* and 4*b* a first and a second molded seal 40*a*, 40*b* may be provided between the end segment 20*a* shown on the left and the middle segment 20*b* and between the middle segment 20*b* and the end segment 20*a* shown on the right, respectively. Regarding the embodiment shown in FIGS. 5 and 6, a first molded seal (not shown) may respectively be provided between the end segments 20*a*.

The oil pan assemblies described with respect to the second aspect of the present disclosure may have the configuration already described with respect to the first aspect.

In particular, in the embodiment, the end segments 20 of the oil pan assembly shown in FIGS. 1 to 3 are used as the end segments 20*a* of the oil pan assemblies shown in FIGS. 4*a* to 4*c*. Therefore, the oil pan assembly shown in FIG. 4*c* is the same oil pan assembly already described with respect to FIGS. 1 to 3.

Figure 16:
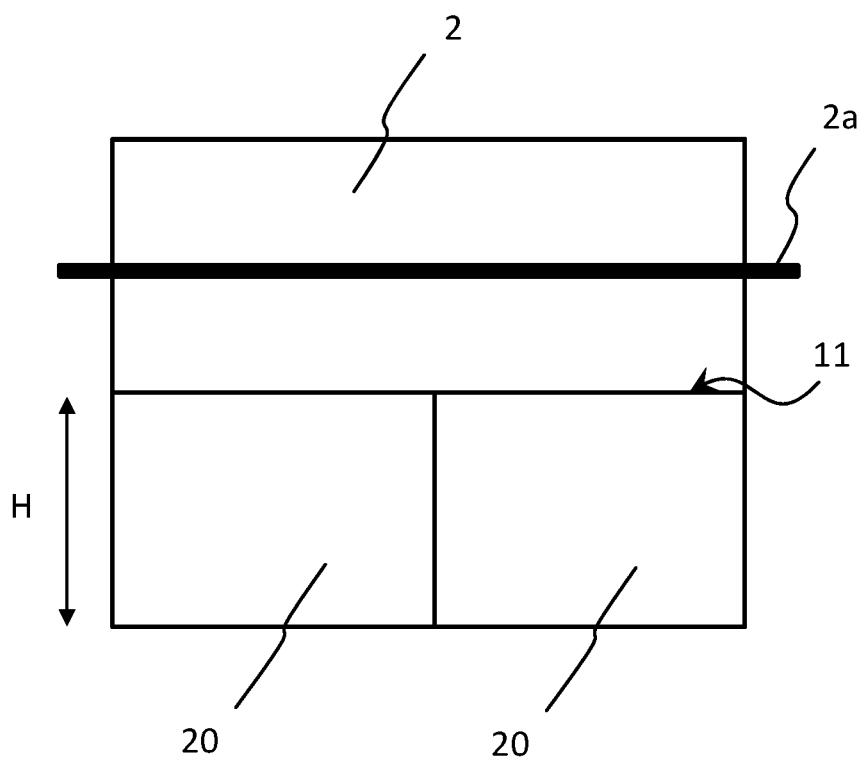
FIG. 16 a front view of an embodiment comprising an oil pan assembly having two end segments, a crankshaft, and a crankshaft leading through two openings provided in the crankcase.

As shown in FIG. 16, the internal combustion engine may comprise a crankshaft 2*a*, the rotational axis of which extends at a level above the first interface 70 between the upper edge portion 11 of the oil pan assembly 10 and the engine casing.

In the embodiment, the rotational axis of the crankshaft 2*a* extends above the level of the upper edge portion 11 of the oil pan assembly through a crankcase forming the engine housing, the bottom side of which is attached to the upper edge portion 11 of the oil pan assembly. In particular, the at least two segments 20, 21 of the oil pan assembly may be attached to a bottom side of a crankcase 2.

The crankcase 2 supports the crankshaft 2*a* at two opposite end portions of the crankshaft 2*a*.

At least one end of the crankshaft 2*a* extends through an opening provided in the crankcase 2. In the shown embodiment, the crankshaft 2*a* extends through a first opening provided in a first sidewall of the crankcase 2 and/or extends through a second opening provided in a second, opposed sidewall of the crankcase 2. Lower edge portions of the first and/or second sidewalls may be sealingly connected to upper edge portions 11 of the oil pan assembly.

According to a third aspect of the present disclosure, a sealing arrangement 30 may be provided having an O-ring 31 and at least one molded seal 40.

The O-ring 31 consists of a flexible material and/ or is shapelessly manufactured. It can therefore be adapted to a certain shape of a first groove 13.

The O-ring has the same cross-section over its entire extension and forms a closed loop. It may for example be provided by connecting two ends of a sealing cord. The cross-section may be circular when the O-ring is uncompressed.

The molded seal (40) comprises two seal end portions (41) comprising sealing areas (48) to be sealingly connected to the O-ring (31). In particular, the sealing areas (48) are provided on a front end side of the seal end portions (41) and contact a side surface of the O-ring.

The embodiment shown in FIG. 7 comprises a sealing arrangement 30 having an O-ring 31, a third molded seal 40*c*, and a fourth molded seal 40*d*. The O-ring 31 is provided for sealing a first interface between an upper edge portion (not shown) of an oil pan assembly and a bottom side (not shown) of an engine casing.

The molded seals 40*c*, 40*d* respectively comprise two seal end portions 41, which are respectively sealingly connected to the O-ring 31.

In the shown embodiment the molded seal 40*c* is provided for sealing an interface between a crankcase (not shown) and a flywheel housing (not shown), wherein the molded seal 40*c* may be arranged in a groove provided in the flywheel housing or the crankcase housing. The molded seal 40*d* is provided for sealing an interface between the crankcase housing and a front end housing (not shown) of the engine, wherein the molded seal 40*d* can be arranged in a groove provided in the front end housing or the crankcase housing.

As shown in FIG. 7 the molded seal 40*d* may comprise two openings 52 for allowing an oil channel to pass through.

The seal end portions 41 of the third and the fourth molded seal 40*c*, 40*d* shown in FIG. 7 may be of the type shown in FIGS. 14 and 15, wherein the O-ring 31 may be arranged in a first groove 13 of an oil pan assembly. The molded seals 40*c*, 40*d* may contact a side of the O-ring, which faces away from the first groove.

In the embodiment shown in FIG. 7 the O-ring 31 extends in a single plane, wherein the molded seals 40*c*, 40*d* extend transversally thereto.

Further, in the shown embodiment the sealing arrangement 30 can be provided for an oil pan assembly (not shown) being made out of one part.

The embodiment shown in FIG. 8 comprises a sealing arrangement 30 having a first molded seal 40*a*, a third molded seal 40*c*, and a fourth molded seal 40*c*. In the shown embodiment the first molded seal 40*a* is provided for sealing a second interface between two segments (not shown) of an oil pan assembly 10, the second interface 71 therefore being a segment interface 71. The molded seal 40*a* extends in a plane which may be orthogonal to the first interface 70, as shown in FIG. 8, wherein the O-ring 31 extends in the first interface 70. The third and fourth molded seals 40*c*, 40*d* extend respectively in further second interfaces 71.

Each of the molded seals 40*a*, 40*c*, and 40*d* shown in FIG. 8 comprises two seal end portions 41.

The two seal end portions 41 of the first molded seal 40*a* can be of the type shown in FIGS. 10 to 13, wherein the seal end portions 41 of the third and fourth molded seal 40*c*, 40*d* may be of the type shown in FIGS. 14 and 15.

In the embodiment shown in FIGS. 7 and 8 the first groove (not shown) can be provided in an upper edge portion of an oil pan assembly (not shown).

In the embodiment shown in FIGS. 7 and 8, such as the molded seals 40a, 40c, 40d are respectively manufactured in a certain shape.

In the embodiment shown in FIG. 9, an internal combustion engine 1 is shown schematically. The embodiment is shown in a demounted state. The engine 1 comprises an oil pan assembly, wherein only small portions of two segments 20 are illustrated, and a sealing arrangement, wherein only small portions of the molded seal 40 and the O-ring 31 are illustrated. In the shown embodiment the engine casing 1a comprises a bottom side 1b, which is formed by a bottom side of a crankcase 2, by a bottom side of a front end 3, and/or by a bottom side of a flywheel housing 4. In FIG. 9 the crankcase 2, the front end 3, and the flywheel housing 4 are illustrated schematically.

In the embodiment shown in FIG. 9 the O-ring 31 is arranged in the first groove 13 which is provided in the upper edge portion 11 of the oil pan assembly (which is in particular formed by the segment upper edge portions 21), wherein the O-ring 31 is provided for sealing the first interface 70 between the upper edge portion 11 and the bottom side 1b of the engine casing 1a.

The first molded seal 40a is sealingly connected to the O-ring 31 and extends between the two segments 20 so as to seal the second interface 71 which is formed there between.

In an embodiment the seal end portion 41 of the first molded seal 40a between two segments 20, as shown in FIG. 9, may comprise a seal end portion 41 with a second groove 42, as for example shown in FIGS. 10 to 13, in which the O-ring 31 can be arranged. Thus the first groove 13 and the second groove 42 may form a continuous groove 13,42 for the O-ring 31, the continuous groove 13,42 being a groove arrangement 13,42.

When the segments 20 shown in the embodiment of FIG. 9 are attached to each other and to the underside 1b of the engine casing 1a, such as by using fasteners leading through openings provided in the shown flanges 24, the O-ring 31 and the first molded seal 40a are compressed by respective adjacent surfaces so as so seal the respective interfaces 70, 71.

According to a fourth aspect of the present disclosure a molded seal 40 for the sealing arrangement 30 comprises a groove for retaining the O-ring 31.

According to the embodiments shown in FIGS. 10 to 13 a sealing arrangement 30 is provided for sealing a transition region between at least three connectable parts of an internal combustion engine. The shown embodiments of the sealing arrangement 30 may be provided for sealing the transition region being present between two segments of an oil pan assembly and an a bottom side of an engine casing, as described with respect to the third aspect.

The O-ring 31 shown in the embodiment illustrated in FIG. 10 has a longitudinal extension L1 and is arranged in the second groove 42, which is provided in the seal end portion 41 of the molded seal 40. The molded seal 40 may be a first molded seal 40a for sealing an interface between two segments of an oil pan assembly (not shown). In the shown embodiment the molded seal 40 comprises a longitudinal extension L2, which runs vertically in the drawing plane of FIG. 10.

As shown, the molded seal 40 may comprise a retaining portion 46 that protrudes from the molded seal 40 transverse to its longitudinal extension L2. Thus a displacement of the molded seal 40 may be blocked, when the O-ring 31 is pressed towards the seal end portion 41.

The embodiment shown in FIG. 11 comprises a sealing arrangement 30 being identical to the one shown in FIG. 10, wherein in FIG. 11 the molded seal 40 is arranged in the groove 29 with the seal end portion 41 of the molded seal 40 being arranged in an enlarged retaining portion 29a of the groove 29.

The seal end portion 41 is formed by an enlarged shoulder portion 45 retained in the enlarged retaining portion 29a of the groove 29. In particular, the enlarged retaining portion 29a of the groove 29 may extend perpendicular to the longitudinal extension of the molded seal L2 and the O-ring L1 along an edge formed between the first and the second interface. The enlarged shoulder portion 45 of the molded seal may extend within the enlarged retaining portion 29a, such that retaining surfaces 29b formed by the bottom of the enlarged retaining portion 29a retain bottom surfaces 45a of the enlarged shoulder portion 45 on both sides of the molded seal.

When the O-ring 31 is pressed against the surface 43 of the second groove 42 provided in the seal end portion 41, the shoulder portion extending in the enlarged retaining portion 29a blocks a displacement of the seal end portion 41.

In the embodiment shown in FIG. 11 the seal end portion 41 comprises a sealing area 48 formed by the second groove 42.

The O-ring 31 is arranged in the second groove 42 and a first groove 13, wherein the first groove 13 is provided in the segment upper edge portion 21 of the segment 20. The O-ring is therefore arranged in a groove arrangement 13, 42, which is formed by the first groove 13 and the second groove 42. In other words, the first groove 13 and the second groove 42 may form a continuous groove 13, 42 in which the O-ring 31 can be arranged.

The molded seal 40 can be provided between two segments 20 of the oil pan assembly 10, wherein in FIG. 11 only one of the two segments 20 is partly shown. In the shown embodiment the groove 29 with its enlarged retaining portion 29a is formed in the segment 20, more precisely in an segment end surface 22. As shown in FIG. 11, the segment 20 comprises a segment upper edge portion 21 which forms a flat upper surface 15 of the oil pan assembly (not shown).

In an alternative embodiment a sealing arrangement 30 with a molded seal 40 having a second groove 42 provided in its seal end portion 41 for retaining an O-ring 31 may be arranged between a crankcase of the engine and another part of the engine casing connectable thereto, wherein a first groove 31 for retaining the O-ring 31 may be formed in a bottom side of the engine casing.

In the embodiment shown FIG. 11 the second groove 42 is such arranged in the seal end portion 41, that an imaginary extension of the longitudinal extension L2 of the molded seal 40 (more precisely the axial center line of the longitudinal extension L2 of the molded seal 40) does not cross with the second groove 42.

In other words, the center of the second groove 42 is arranged at a distance to an imaginary extension of a side wall 22 of the groove 29 and therefore at a position above a bottom surface of the enlarged retaining portion 29a of the groove.

In this case, when the O-ring 31 is pressed against a surface 43 of the second groove 42, the bottom side of the shoulder portion 45 of the seal end portion 41 is pressed against a bottom surface of the enlarged retaining portion 29a of the groove. Thus a displacement of the seal end portion 41 is blocked.

In an alternative embodiment, the second groove 42 may be arranged in the seal end portion 41 such that an imaginary extension of the longitudinal extension L2 of the molded seal 40 (more precisely the axial center line of the longitudinal extension L2 of the molded seal 40) crosses with the second groove 42.

It is also conceivable to provide an embodiment of a molded seal having one seal end portion 41 with a second groove 42 being arranged such that it does not cross with the imaginary extension of the longitudinal extension L2 of the respective molded seal 40, and having another seal end portion 41 with another second groove 42 being arranged such that it does cross with the imaginary extension of the longitudinal extension L2 of the molded seal 40.

The embodiment shown in FIG. 12 and FIG. 13 illustrates a molded seal 40 having a seal end portion 41 comprising three sealing ribs 44. The molded seal 40 shown in FIG. 12 and in FIG. 13 is identical to the one shown in FIG. 10 and FIG. 11. As shown in FIG. 12 and FIG. 13, the sealing ribs 44 protrude from a surface 43 of the second groove 42 and may reach from one side of the sealing surface 47 of the seal end portion 41 over the surface 43 of the second groove 42 to the other side of the sealing surface 47. In the shown embodiment the sealing ribs 44 extend orthogonally to a longitudinal extension L1 of the O-ring 31 (not shown).

As can be seen in FIG. 11, the O-ring 31 may be pressed, such as by a bottom side of an engine casing (not shown), against the sealing ribs 44 such that O-ring 31 compresses the sealing ribs 44 towards the surface 43 of the second groove 42. Thus an enhanced sealing can be provided.

FIGS. 14 and 15 illustrate an embodiment of a molded seal 40, which can be provided between a side surface of a crankcase (not shown) and another side surface of a part of the engine casing connectable to the crankcase. Referring to FIG. 9, the molded seal 40 shown in FIG. 14 can be provided between the crankcase 2 and the flywheel housing 4 and/or between the crankcase 2 and the front end 3, wherein the molded seal 40 shown in FIGS. 14 and 15 can be provided at a side of the O-ring 31 facing away from the first groove 13.

As illustrated in FIG. 14, the seal end portion 41 of the molded seal 40 equally comprises an enlarged shoulder portion, which is retained in an enlarged retaining portion of a groove in the same way as the enlarged shoulder portion of the embodiments of the molded seal described earlier.

As shown in FIG. 15, the sealing surface 50 of the molded seal 40 is pressed against an O-ring 31 arranged in a first groove 13. In the shown embodiment the first groove 13 is provided in an upper edge portion 11 of an oil pan assembly (not shown).

As can be seen in FIG. 14, the sealing surface 50 of the molded seal 40 has a flat shape and extends in a single plane when the seal is uncompressed. In alternative embodiments, if might also have a convex shape, for example a middle portion protruding from the sealing surface.

In FIG. 15 the sealing arrangement 30 is shown in a mounted state, the sealing arrangement 30 therefore being in a compressed state, which means that the upper edge portion 11 of the oil pan assembly (not shown) presses the O-ring 31 against the sealing surface 50 of the molded seal 40.

The seal end portion 41 shown in FIG. 15 is such configured that in the shown mounted state a portion of the seal end portion 41 reaches into the first groove 13. More precisely, the middle portion 50b of the sealing surface 50 of the seal end portion 41 reaches into the first groove 13. With the shown embodiment it is possible that the sealing surface 50 adapts its shape at least partially to the O-ring. The sealing between the O-ring 31 and the molded seal 40 can be enhanced consequently. As can be seen in FIG. 15 the middle portion 50b is arranged between two side portions 50a of the sealing surface 50.

Further FIG. 15 illustrates that the seal end portion 41 of the molded seal 40 may be such configured that the side portions 50a of the sealing surface 50, in a mounted state, are pressed against respective surfaces of the upper edge portion 11, which are respectively arranged adjacent to the surface of the first groove 13, which means that the surfaces are arranged at one and on another side of the first groove 13, in FIG. 15 to the left and to the right of the first groove 13, respectively.

Subsequently, in a mounted state, beside the sealing between the O-ring 31 and the middle portion 50b of the sealing surface 50, at least another sealing can be provided between the respective side portions 50a of the sealing surface 50 and the respective surface of the upper edge portion 11. In the shown embodiment of FIG. 15 three sealing areas are provided: between the O-ring 31 and the middle portion 50b of the sealing surface 50, between one side portion 50a (in FIG. 15 on the left) of the sealing surface 50 and the respective surface of the upper edge portion 11, and between the other side portion 50a (in FIG. 15 on the right) of the sealing surface 50 and the respective surface of the upper edge portion 11.

Referring to FIG. 15, the retaining surface 60 of the enlarged retaining portion of the groove in which the molded seal 40 is provided blocks the shoulder surface 54 of the enlarged shoulder portion of the seal end portion 40. The retaining surface 60 may comprise an outer portion 60a and an inner portion 60b, wherein the inner portion 60b is arranged closer to a center axis of the longitudinal extension L2 of the molded seal 40 than the outer portion 60a, wherein the inner portion 60b may extend closer to the bottom side of the engine casing than the outer portion 60a. Subsequently the effect of at least a part of the seal end portion 41, such as the middle portion 50b, reaching into the first groove 13 in a mounted stated can be enhanced.

In the embodiment shown in FIG. 15 the seal end portion 41 comprises sealing areas 48, which are formed by the middle portion 50b and respective side portions 50a of the sealing surface 50.

As described above, the molded seal 40 shown in FIG. 15 may be arranged in a groove 29, wherein the seal end portion 41 may be provided in a enlarged retaining portion 29a of the groove 29. Referring to FIG. 9, the groove 29 may be provided in the front end 3, the crankcase 2 and/or the flywheel housing 4 of the engine casing 1a, the groove 29 can however be provided in the front end and/or the flywheel housing 4. In the embodiment shown in FIG. 15 the enlarged retaining portion 29a of the groove 29 forms the retaining surface 60 for blocking the seal end portion 41.

As shown in FIG. 14, the seal end portion 41 may be provided on a side surface facing the groove 29 and/or the side surface facing the other engine part with a sealing protrusion 53. The sealing protrusion 53 may protrude from a side surface 41a of the seal end portion 41 in a direction transverse to the longitudinal extension L2 of the molded seal 40, wherein the sealing protrusion 53 may extend from one side portion 50a of the sealing surface 50 to the respective other side portion 50a of the sealing surface 50, such as in a U-shaped form.

The configuration of the sealing arrangement shown in FIGS. 10 to 14 may in particular be used with the sealing arrangements described with respect to FIGS. 7 to 9.

Further, the sealing arrangements described with respect to FIGS. 8 to 14 may in particular be used with the oil pan assemblies described with respect to FIGS. 1 to 6.

The sealing arrangement described with respect to FIG. 7 may be used with an oil pan assembly where the oil pan is a single casted part.

FIGS. 1-6, and 9-13 are drawn to scale, although other relative dimensions may be used, if desired. The figures show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

REFERENCE SIGN LIST 1 internal combustion engine
1*a* engine casing
1*b* bottom side of engine casing
2 crankcase
2*a* crankshaft
3 front end
4 flywheel housing
10 oil pan assembly
11 upper edge portion
12 bottom side of oil plan assembly/segment
13 first groove
14 stiffening rib
14*a* opening of stiffening rib
14*b* side portion of stiffening rib
14*c* middle portion of stiffening rib
15 flat upper surface
20 segment
20*a* end segment
20*b* middle segment
21 segment upper edge portion
22 segment end surface
23*a* end wall
23*b* side wall
23*c* bottom wall
24 flange
24*a* upper flange surface
24*b* flange end surface
24*c* openings provided in the flange
25 edge
26 opening
27 opening
28 leg
29 groove
29*a* enlarged retaining portion of groove
30 sealing arrangement
31 O-ring
40 molded seal
40*a* first molded seal
40*b* second molded seal
40*c* third molded seal
40*d* fourth molded seal
41 seal end portion
41*a* side surface of seal end portion
42 second groove
43 surface of second groove
44 sealing rib
45 shoulder portion
46 retaining portion of molded seal
47 sealing surface of a molded seal being arranged at a side of the O-ring facing the first groove
48 sealing area of seal end portion
50 sealing surface of a molded seal being arranged at a side of the O-ring facing away from the first groove
50*a* side portion of sealing surface
50*b* middle portion of sealing surface
52 opening for oil channel
53 sealing protrusion
54 retaining surface
60 blocking surface
60*a* outer portion of blocking surface
60*b* inner portion of blocking surface
70 first interface
71 second interface, segment interface
L longitudinal direction of the engine
L1 Longitudinal extension of O-ring
L2 Longitudinal extension of molded seal
H segment height

The invention claimed is:

1. An internal combustion engine, comprising:
an engine casing and an oil pan assembly attached to a bottom side of the engine casing, wherein the oil pan assembly is formed by at least one casted segment,
wherein the oil pan assembly is formed by at least two segments, wherein the at least two segments are casted parts and are arranged next to each other in a longitudinal direction of the engine, and
wherein the at least two segments each have an equal segment height in a direction orthogonal to a first interface between an upper edge portion of the oil pan assembly and the bottom side of the engine casing.

2. The internal combustion engine according to claim 1, wherein a segment interface between two adjacent segments of the at least two segments is transverse to the first interface between the upper edge portion of the oil pan assembly and the bottom side of the engine casing.

3. The internal combustion engine according to claim 1, wherein the oil pan assembly comprises two end segments each having an end wall and two side walls, wherein the end segments are directly connected to each other or wherein the oil pan assembly further comprises at least one middle segment arranged between the end segments, wherein the middle segment comprises two side walls.

4. The internal combustion engine according to claim 2, wherein at least one segment of the at least two segments comprises a flange, which is attachable to another segment and/or to the bottom side of the engine casing by means of fasteners.

5. The internal combustion engine according to claim 4, wherein the flange of the at least one segment is formed so as to entirely surround an edge of the at least one segment, and further comprises a flange end surface pressing a molded seal against an end surface of an adjacent segment and/or wherein an upper flange surface and the flange end surface are arranged orthogonally to each other, and/or
wherein a middle segment comprises a flange with two upper flange surfaces each forming a part of the upper edge portion of the oil pan assembly and each pressing a part of an O-ring against the bottom side of the engine casing, and with two opposite flange end surfaces respectively pressing a molded seal against an end surface of a respective adjacent segment.

6. The internal combustion engine according to claim 2, wherein the engine casing is a crankcase, such that the upper edge portion of the oil pan assembly is attached to a bottom side of the crankcase, wherein a crankshaft extends within the crankcase, and/or
wherein a rotational axis of a crankshaft extends at a level above the upper edge portion of the oil pan assembly forming a first interface of the oil pan assembly to an engine housing.

7. An internal combustion engine, comprising:
an engine casing and an oil pan assembly attached to a bottom side of the engine casing, wherein the oil pan assembly is formed by at least one casted segment,
wherein the oil pan assembly is formed by at least two segments, wherein the at least two segments are casted parts and are arranged next to each other in a longitudinal direction of the engine, and wherein the at least two segments each comprise a plurality of leg portions that extend from a wall of the at least two segments, the leg portions supporting the oil pan assembly when it is placed on a ground surface.

8. The internal combustion engine according to claim 1, at least two segments are configured such that the segments, when being placed on a flat surface and arranged adjacent to each other so as to be connectable to each other, form a flat upper surface of the oil pan assembly and/or form a continuous first groove in which an O-ring can be arranged.

9. An internal combustion engine, comprising:
an engine casing and an oil pan assembly attached to a bottom side of the engine casing, wherein the oil pan assembly is formed by at least one casted segment,
wherein the oil pan assembly is formed by at least two segments, wherein the at least two segments are casted parts and are arranged next to each other in a longitudinal direction of the engine,
wherein at least one of the segments comprises at least one stiffening rib connecting one side wall with another side wall and/or with a bottom wall, wherein at least one stiffening rib is formed such that an oil exchange is possible from an area located adjacent to one side of the stiffening rib to an area located adjacent to another side of the stiffening rib and/or wherein one or more openings are provided between the stiffening rib and the segment from which the stiffening rib extends; and/or
wherein the at least one stiffening rib is such configured that in a side view along a longitudinal direction of the engine, the stiffening rib comprises two side portions and a middle portion arranged there between, wherein at least one of the side portions reaches closer to an imaginary plane defined by a segment upper edge portion than the middle portion.

10. An internal combustion engine, comprising:
an engine casing and an oil pan assembly attached to a bottom side of the engine casing, wherein the oil pan assembly is formed by at least one casted segment,
wherein the oil pan assembly is formed by at least two segments, wherein the at least two segments are casted parts and are arranged next to each other in a longitudinal direction of the engine, and wherein the oil pan assembly comprises at least one opening, provided in a segment side wall and/or end wall, for allowing an oil exchange between an inside and an outside area of the oil pan assembly.

11. The internal combustion engine according to claim 1, wherein the oil pan assembly comprises an O-ring for sealing a first interface between an upper edge portion of the oil pan assembly and the bottom side of the engine casing, wherein the O-ring extends in a plane formed by the first interface, such as in a first groove provided in an upper edge portion of the oil pan assembly.

12. An internal combustion engine, comprising:
an engine casing and an oil pan assembly attached to a bottom side of the engine casing, wherein the oil pan assembly is formed by at least one casted segment,
wherein the oil pan assembly is formed by at least two segments, wherein the at least two segments are casted parts and are arranged next to each other in a longitudinal direction of the engine,
wherein the oil pan assembly comprises an O-ring for sealing a first interface between an upper edge portion of the oil pan assembly and the bottom side of the engine casing, wherein the O-ring extends in a plane formed by the first interface, such as in a first groove provided in an upper edge portion of the oil pan assembly, wherein the engine comprises a third and/or a fourth molded seal, wherein the third and/or the fourth molded seal each have two seal end portions respectively being connected to the O-ring so as to seal respective transition regions, wherein a third molded seal is provided between a side surface of a crankcase of the engine casing and a side surface of a flywheel housing of the engine casing and/or wherein the fourth molded seal is provided between another side surface of the crankcase and a side surface of a front end of the engine casing, wherein the third and/or the fourth molded seal comprises at least one opening, with an O-shaped form, wherein an oil channel leads through the opening, and/or wherein the seal end portions have a flat or convex shape.

13. A set comprising at least a first and a second internal combustion engines according to claim 1, the first and second internal combustion engines each comprising at least one first segment of the oil pan assembly that is identical for the first and second internal combustion engines, wherein the second internal combustion engine comprises at least one second segment of the oil pan assembly which is different from a second segment of the oil pan assembly of the first internal combustion engine or provided in addition to the segments of the oil pan assembly of the first internal combustion engine.

14. The set according to claim 13, wherein the first internal combustion engine comprises two end segments, which are directly attached to each other so as to form a first oil pan assembly, and wherein the second internal combustion engine comprises two end segments which are respectively identical to the two end segments of the first internal combustion engine, and at least one middle segment, wherein the two end segments and the least one middle segment of the second internal combustion engine are respectively attached to each other so as to form a second oil pan assembly, or wherein the second internal combustion engine comprises two end segments, which are directly attached to each other so as to form a second oil pan assembly, wherein one of the end segments is identical for the first and the second internal combustion engines and one of the end segments is different for the at least two internal combustion engines, or wherein the first and the second internal combustion engine each comprise two end segments of the oil pan assembly which are respectively identical, and different middle segments, the two end segments and the least one middle segment being respectively attached to each other so as to form an oil pan assembly.

15. A method for manufacturing at least one internal combustion engine comprising an oil pan assembly formed by at least two segments, wherein the method comprises:

providing a first segment, being independent from a length of the engine, wherein the first segment is identical for at least two different internal combustion engines;

providing a second segment, being selected according to the length of the engine; and/or providing a second end segment and at least one middle segment for being arranged between the first end segment and the second end segment, wherein at least one out of the second end segment and the middle segment is selected according to the length of the engine.

16. The internal combustion engine according to claim 4, wherein the fasteners lead through interspaced openings provided in the flange.

17. The internal combustion engine according to claim 5, wherein the flange of an end segment comprises an upper flange surface forming a part of the upper edge portion of the oil pan assembly and pressing a part of an O-ring against the bottom side of the engine casing and the two upper flange surfaces are arranged orthogonally to the two opposite flange end surfaces and/or wherein the flange of the middle segment is formed so as to entirely surround an edge of the middle segment.

18. The internal combustion engine according to claim 6, wherein the crankshaft extends through at least one opening provided in a sidewall of the engine housing at a level above the upper edge portion.

19. The internal combustion engine according to claim 7, wherein the leg portions are integrally casted with the segment and/or wherein at least one of the leg portions forms at least a part of a flange for fastening two adjacent segments together.

20. The internal combustion engine according to claim 1, having at least twelve cylinders.

* * * * *